United States Patent
Moisio et al.

[15] 3,691,455
[45] Sept. 12, 1972

[54] MEASURING METHOD FOR ANALYZING MATERIAL CONTAINING FAT AND WATER

[72] Inventors: Tauno V. Moisio; Matti S. Kreula, both of Helsinki, Finland

[73] Assignee: Valio-Meijerien Keskusosuusliike, Helsinki, Finland

[22] Filed: Jan. 11, 1971

[21] Appl. No.: 105,567

[30] Foreign Application Priority Data

Jan. 28, 1970   Finland..........................23970

[52] U.S. Cl. ...............................................324/0.5 R
[51] Int. Cl. ............................................G01n 27/78
[58] Field of Search.........324/0.5 A, 0.5 AC, 0.5 AH

[56] References Cited

UNITED STATES PATENTS 3,568,046   3/1971   Watson....................324/0.5 A

*Primary Examiner*—Michael J. Linch
*Attorney*—Cushman, Darby & Cushman

[57] ABSTRACT

In materials containing fat and water simultaneously the water share is determined separately by making use of an ordinary NMR analyzer which is usually capable of measuring only the total sum of said components. In such analyzers the strength of the magnetic field of the r.f. coil, in which the sample is inserted, is kept constant by a correction amplifier controlling current flow through the r.f. coil. The r.f. losses of said coil depend essentially on the water content of the sample but not on the fat content and the water share is separately determined by using the output of said correction amplifier preferably by directly measuring this output.

7 Claims, 2 Drawing Figures

PATENTED SEP 12 1972 3,691,455

INVENTORS
TAUNO V. MOISIO
MATTI S. KREULA

Cushman, Darby & Cushman
ATTORNEYS

MEASURING METHOD FOR ANALYZING MATERIAL CONTAINING FAT AND WATER

BACKGROUND OF THE INVENTION

1. Field of the Invention

This invention relates to an improved method for analyzing a material containing fat and water simultaneously, using a high-resolution NMR analyzer (Nuclear Magnetic Resonance).

2. Description of the Prior Art

The known measuring instruments of this type usually share the common feature that the sample is inserted into an r.f. coil, the strength of the magnetic field of which is kept constant by a stabilizer which continuously controls the current of the r.f. coil.

This type of instrument is usually designed to measure, by means of proton resonance, only the amount of non-crystallized materials in the sample. Usually it concerns measuring the melted fats or the water in the sample. If the sample contains both water and fat, only their sum can be measured.

Very often, however, it is desirable to determine separately the fat content or the water content of a material containing both of these components. This cannot be done by the known NMR analyzers with their present coupling. For example, in the production of powdered milk, it is essential to know both the fat content and the water content of the material, because the limits set for them nowadays are very strict (e.g. fat content 26.2 percent and water content 3.0 percent). The above-mentioned analyzers permit a fairly easy determination of the total amount of water and fat, but the share of water in the total must be determined separately by gravimetric methods lasting several hours. This is, of course, very disadvantageous in view of continuous production, because a composition possibly deviating from the allowed limits is detected far too late.

SUMMARY OF THE INVENTION

The present invention involves an improvement of the measuring method described above. It creates a facility for considerably more rapid determination of the water content of a material, while still using the known analyzers.

It has been noted through measurements that the r.f. losses of the coil are conditioned by the water content of the sample in the coil, but not essentially by its fat content. This condition is not fully linear, mainly due to the fact that at least when the water content is small, part of the water is bound water, and its effect is different from that of unbound water. It is essential, however, that this condition is continuous and unambiguous, in other words, evenly rising, so that the r.f. loss increases according to the water content. This observation is not new in principle, because in other connections the humidity of a material is known to be determined by measuring the r.f. loss caused by it. This measuring method has not, however, been applied to ordinary NMR meters in order to extend their application. Used in connection with these measuring instruments, the method is also very advantageous, because additional information required can surprisingly be obtained from them by fairly simple methods.

As was said above, a stabilizer is usually used in the NMR meters to control the current which creates the magnetic field of the r.f. coil. The stabilizer usually has a correction amplifier or the like, the output voltage of which is used as the control quantity for controlling the said current. To obtain correct results, it is therefore necessary that the strength of the r.f. field is kept constant, but the height of the said control voltage or its variation are not used in forming the result. The control quantity, however, varies unambiguously according to the r.f. loss of the coil, and thus according to the water content of the sample.

By using this control quantity, either by measuring it directly or by changing the information given by it into a suitable digital display through electronic converters, the total fat and water content as well as the separate water content can be determined simultaneously in a few minutes. If a digital display is desired, in which the share of both components is given separately, it is fairly easy to do the required subtraction electronically.

Accordingly, this invention involves extending of the usefulness of known measuring instruments.

BRIEF DESCRIPTION OF THE DRAWINGS

In the following, the invention is presented in the form of a practical example with reference to the attached drawing in which.

The abscissa refers to the $H_2O$ content (measured gravimetrically) and the ordinate refers to the variation in the output of the correcting amplifier as compared to the zero level.

DESCRIPTION OF THE EMBODIMENTS

Figure 1:
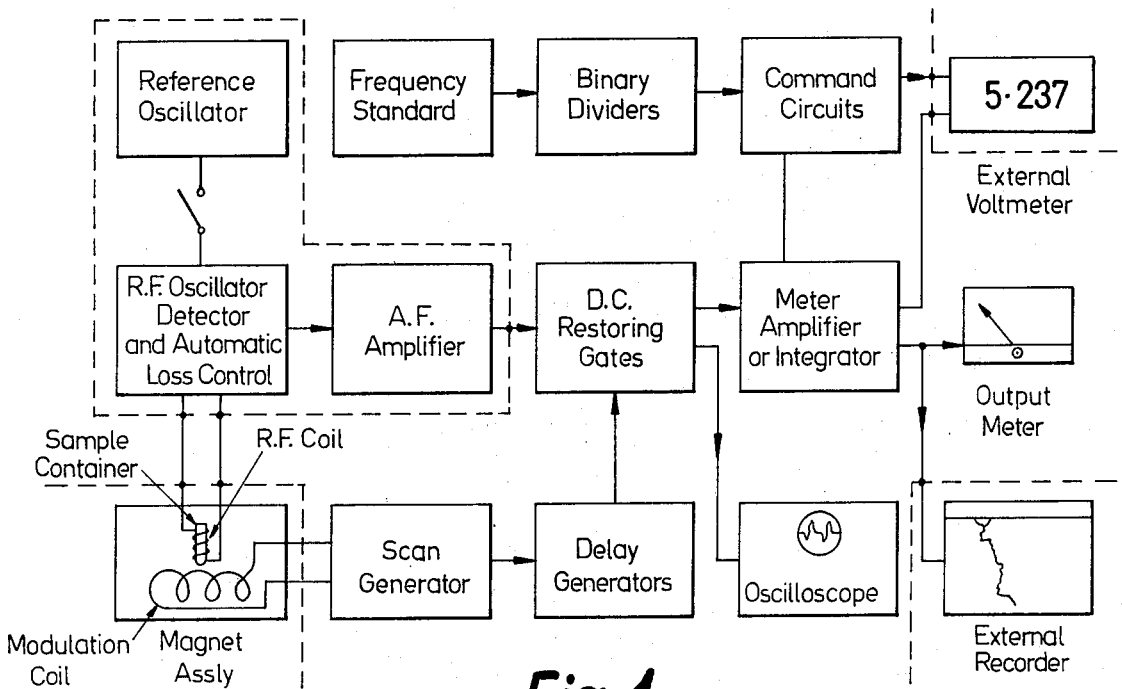
FIG. 1 shows a block diagram of the known NMR analyzer used in the experiments.

In the measuring experiments use was made of an analyzer (Newsport Quantity Analyzer QA2), made by the British firm Newsport Instruments; a segmental diagram of the analyzer is given in FIG. 1. As to the arrangement of the magnetic fields, the operation of the instrument in principle is as follows:

A stable permanent magnet of special design is used to produce a large volume of homogeneous field. The r.f. coil, into which the sample is inserted, is situated in the center of the magnet. This produces a homogeneous r.f. field so that the sample is subjected to both steady and rapidly varying magnetic fields at right angles to one another. Modulation coils on the magnet add a small low-frequency oscillatory component to the steady magnetic field and the proton resonance is excited each time the field is swept through the gyromagnetic resonance value corresponding to the frequency of the r.f. oscillation. By correct adjustment of the r.f. oscillator frequency two resonances are produced every cycle. The energy absorbed from the r.f. coil by these resonances produces a characteristic modulation of the r.f. envelope. This modulation is detected and amplified in a stable-gain a.c. coupled amplifier.

The operation of the analyzer is not explained in more detail in this connection as it is well known to professional people in this field and is also to be found in the manufacturer's manual.

As was said before, in the automatic loss compensation circuit on the feeder side of the r.f. coil there is a correcting amplifier which controls the current flow to the coil. In the present analyzer this correcting amplifier has been realized by an operational amplifier which is not shown as such in the block diagram.

In the experiments the water and fat contents of the powdered milk were measured using the method according to the invention. The total water and fat content could then be read directly of the analogue meter of the measuring instrument or by using a digital display unit. In the determination of the water content separately, use was made of the voltage in the output of the said operational amplifier; the voltage varied unambiguously according to the water content.

Figure 2:
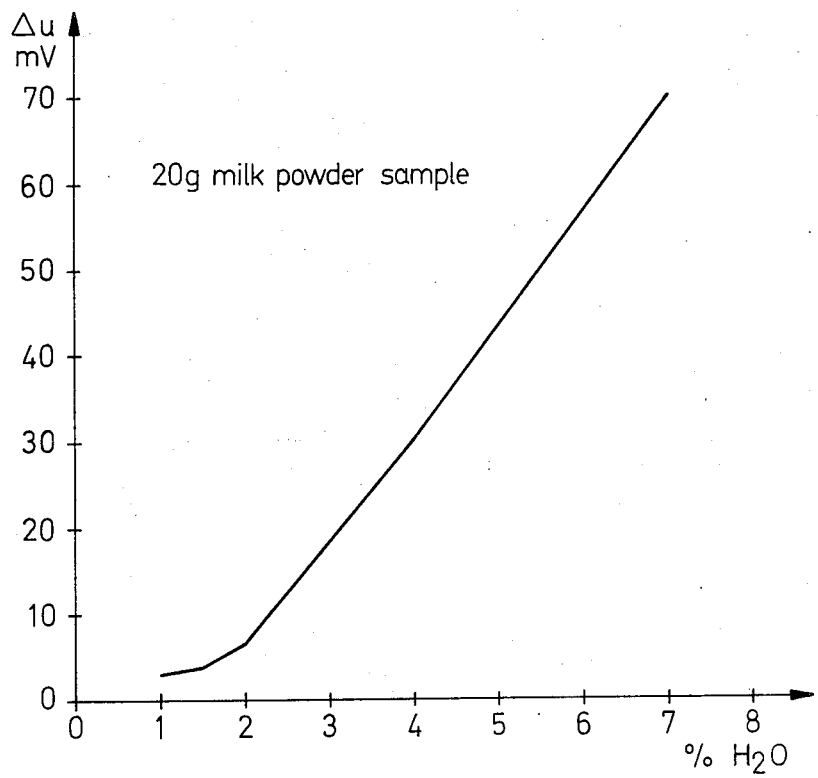
FIG. 2 shows a calibration curve measured for powdered milk.

FIG. 2 shows the deviation of the output voltage of the operational amplifier from the voltage of the comparison level which corresponds to fully dry powdered milk. In the determination of the calibration curve according to FIG. 2, the water content of the powdered milk has been determined by time-taking gravimetrical methods. The calibration curves required have to be measured for different materials containing water and fat, but when these curves have been obtained, the water content of a sample belonging to the group of materials in question can be determined very rapidly and easily and with fairly great accuracy.

The output variation of the correcting amplifier can be amplified if required, and used further to indicate the water content on an ordinary analogue meter. Using an A/D-converter the output signal can also be connected to a digital display unit in the known manner. As these measures are well known to every professional in this field, they are not dealt with in detail in this connection.

As many of the materials to be examined contain water and fat simultaneously, it is obvious that the knowledge of the water content separately is a very often desired piece of additional information. The invention is naturally not limited to the given example, but it can be modified within the scope of the following claims.

What is claimed is:

1. In a method for analyzing a sample containing both fat and water in an NMR analyzer of the type wherein the sample during measurement is inserted in an r.f. coil, the r.f. field of which is kept constant, irrespective of r.f. losses caused by the sample, by control means automatically controlling current flow into the coil, the improvement comprising:
   measuring the output of said control means, such output being essentially dependent only on the water content of the sample, and
   determining the water content of the sample from the measured output.

2. A method according to claim 1 wherein the NMR-analyzer is of the type where the r.f. field of the r.f. coil is automatically controlled by means of a stabilizer, the output voltage of which controls the r.f. coil current, comprising:
   measuring said output voltage and comparing same with a precalibrated scale for determining the water content of the sample separately.

3. A method according the claim 2, further comprising:
   carrying out the comparation electronically,
   electronically converting the result thereof and displaying the sample water content in digital form.

4. A method for separately determining the water content of a sample containing both fat and water using an NMR analyzer normally capable of measuring and determining only the total sum of fat and water content in a sample, said method comprising:
   measuring the output of a control means normally provided in said NMR analyzer for maintaining a constant r.f. field environment for said sample irrespective of r.f. losses introduced by the sample, said r.f. losses being a predetermined function of the water content of the sample, and
   determining the water content of the sample from the measured output of said control means.

5. A method as in claim 4 wherein said measuring step comprises measuring the output voltage of a stabilizer in the NMR analyzer, said stabilizer output voltage being used within the NMR analyzer as a control variable for controlling the r.f. current supplied to an r.f. coil adapted to encompass said sample.

6. A method as in claim 4 wherein said determining step comprises converting the measured output to a water content value using said predetermined function.

7. A method as in claim 6 wherein said converting step is performed electronically.

* * * * *